(12) United States Patent
Kogan (10) Patent No.: US 8,576,223 B1
(45) Date of Patent: Nov. 5, 2013

(54) MULTIPLE LABEL DISPLAY FOR 3D OBJECTS

(75) Inventor: David Kogan, Natick, MA (US)

(73) Assignee: Google Inc., Mountain View, CA (US)

(*) Notice: Subject to any disclaimer, the term of this patent is extended or adjusted under 35 U.S.C. 154(b) by 103 days.

(21) Appl. No.: 13/075,061

(22) Filed: Mar. 29, 2011

(51) Int. Cl.
*G06T 15/00* (2011.01)

(52) U.S. Cl.
USPC .......................................................... 345/419

(58) Field of Classification Search
USPC ........................................................... 345/419
See application file for complete search history.

(56) References Cited

U.S. PATENT DOCUMENTS

| | | | | |
|---|---|---|---|---|
| 5,526,478 | A * | 6/1996 | Russell et al. | 715/202 |
| 6,169,545 | B1 | 1/2001 | Gallery et al. | |
| 7,474,317 | B2 * | 1/2009 | Dolph et al. | 345/629 |
| 7,557,804 | B1 * | 7/2009 | McDaniel | 345/427 |
| 7,636,096 | B2 * | 12/2009 | Mikulecky | 345/619 |
| 7,697,013 | B2 * | 4/2010 | Dolph et al. | 345/629 |
| 7,697,014 | B2 * | 4/2010 | Dolph et al. | 345/629 |
| 8,416,240 | B1 | 4/2013 | Kuffner, Jr. et al. | |
| 8,456,467 | B1 | 6/2013 | Hickman et al. | |
| 2011/0161875 | A1 * | 6/2011 | Kankainen | 715/810 |
| 2011/0254861 | A1 * | 10/2011 | Emura et al. | 345/633 |
| 2011/0273473 | A1 * | 11/2011 | Kim | 345/629 |
| 2011/0273575 | A1 * | 11/2011 | Lee | 348/222.1 |
| 2012/0099000 | A1 * | 4/2012 | Kim | 348/231.99 |
| 2012/0194547 | A1 * | 8/2012 | Johnson et al. | 345/632 |

OTHER PUBLICATIONS

Sons, Kristian, et al. "Xml3d: interactive 3d graphics for the web." Proceedings of the 15th International Conference on Web 3D Technology. ACM, 2010.*
Russell, Bryan C., et al. "LabelMe: a database and web-based tool for image annotation." International journal of computer . vision 77.1 (2008): 157-173.*
Chittaro, Luca, Vijay Kumar Gatla, and Subramanian Venkataraman. "The Interactive 3D BreakAway Map: A navigation and examination aid for multi-floor 3D worlds." Cyberworlds, 2005. International Conference on. IEEE, 2005.*
Fan Zhang; Hanqiu Sun; , "Dynamic labeling management in virtual and augmented environments," Computer Aided Design and Computer Graphics, 2005. Ninth International Conference on , vol., no., pp. 6 pp., Dec. 7-10, 2005.*
Preim, Bernhard, Andreas Raab, and Thomas Strothotte. "Coherent zooming of illustrations with 3D-graphics and text." Graphics Interface. vol. 97. 1997.*
"ContMedia Human 3D Advanced Internet Edition", ContMedia Shop, Mar. 8, 2011, http://www.contmediausa.com/Shop/App/Products/Details.aspx?pid=1.

(Continued)

*Primary Examiner* — Aaron M Richer
*Assistant Examiner* — Vu Nguyen
(74) *Attorney, Agent, or Firm* — Morris & Kamlay LLP (57) ABSTRACT

A method for viewing a 3D object is described. The method includes obtaining viewable data of a 3D object and displaying a portion of the 3D object based on a current view. The method also includes retrieving at least one identification label for items within the current view, defining a first axis within the current view, and selecting, from a plurality of positions along the first axis, a position that has a smallest angle between the selected position and a selected item. The method further includes displaying the identification label associated with the selected item at a point along a second axis within the current view between the selected position and the selected item. Systems and machine-readable storage media are also described.

15 Claims, 7 Drawing Sheets

(56) References Cited

OTHER PUBLICATIONS

Gering,"A System for Surgical Planning and Guidance using Image Fusion and Interventional MR", Masters thesis, Massachusetts Institute of Technology, Department of Electrical Engineering and Computer Science, pp. 1-106, 1999.

Shout3DUC.,"2.5—Demo Tour", Available at: http://shout3d.net/shout3d_2.5_doc_dir/Shout3d_runtime/demos/demo_tour/1.html, pp. 1-11, Feb. 2005.

Visible Body,"3D Human Anatomy", Available at: http://www.visiblebody.com. Visited on: Mar. 28, 2012, 2007.

* cited by examiner

MULTIPLE LABEL DISPLAY FOR 3D OBJECTS

BACKGROUND

1. Field

The present disclosure generally relates to displaying labels associated with the visualization of three-dimensional objects using a computer.

2. Description of the Related Art

Current three-dimensional (3D) rendering systems display 3D objects in a 3D space and allow the objects to be viewed from numerous viewpoints surrounding the 3D object. However, when portions or items of these objects are labeled, the labels often overlap or overlay one another and/or obstruct the view and/or label of portions or items of the object a user may wish to see. As such, it is difficult for the user viewing the 3D object to read the labels associated with the 3D object and also view the 3D object.

SUMMARY

According to one aspect of the present disclosure, a method for viewing a labeled three-dimensional (3D) object is disclosed. The method includes obtaining viewable data of a 3D object, and displaying at least a portion of the 3D object based on a current view comprising an initial default view, or a user selected view based on a query received from a user. The method also includes retrieving, from storage, at least one identification label for each of a plurality of items within the current view, defining a first axis within the current view, and selecting, from a plurality of positions along the first axis, a position that has a smallest angle between the selected position and a selected item from the plurality of items. The method further includes displaying the identification label associated with the selected item at a point along a second axis within the current view between the selected position and the selected item.

According to another aspect of the present disclosure, a system for viewing a labeled three-dimensional (3D) object is disclosed. The system includes a memory for storing viewable data of a 3D object, and a plurality of identification labels associated with the 3D object, and a processor. The processor is configured to display at least a portion of the 3D object based on a current view comprising an initial default view, or a user selected view based on a query received from a user, and retrieve at least one identification label, from the plurality of identification labels, for each of a plurality of items within the current view. The processor is further configured to define a first axis within the current view, select, from a plurality of positions along the first axis, a position that has a smallest angle between the selected position and a selected item from the plurality of items, and display the identification label associated with the selected item at a point along a second axis within the current view between the selected position and the selected item.

According to a further aspect of the present disclosure, a machine-readable storage medium comprising machine-readable instructions for causing a processor to execute a method for viewing a labeled three-dimensional (3D) object is disclosed. The method includes obtaining viewable data of a 3D object, and displaying at least a portion of the 3D object based on a current view comprising an initial default view, or a user selected view based on a query received from a user. The method also includes retrieving, from storage, at least one identification label for each of a plurality of items within the current view, defining a first axis within the current view, and selecting, from a plurality of positions along the first axis, a position that has a smallest angle between the selected position and a selected item from the plurality of items. The method further includes displaying the identification label associated with the selected item at a point along a second axis within the current view between the selected position and the selected item.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system uses a web browser with integrated (e.g., built in) 3D modeling and searching capabilities for viewing and searching a 3D image or object, such as a web browser pre-installed with WebGL. Using the enhanced web browser, the user can view the 3D image, including labels that identify portions of the 3D image. The labels are dynamically placed according to an algorithm in a location that clearly identifies the portion of the 3D image being labeled in a manner that does not obstruct the user's view of that portion of the 3D image, but also in a way that labels do not overlap one another.

Exemplary Architecture

Figure 1:
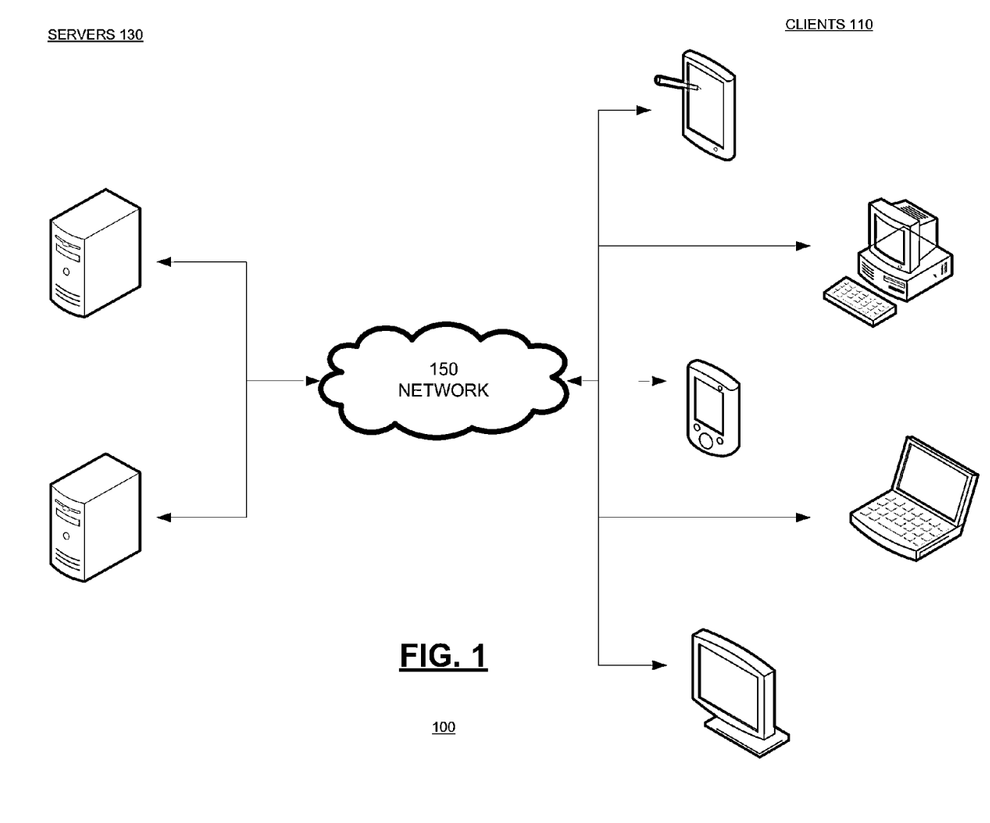
FIG. 1 illustrates an exemplary architecture for viewing and searching a 3D object using a web browser having integrated 3D modeling and searching capabilities.

FIG. 1 illustrates an exemplary architecture 100 for viewing and searching a 3D object using a web browser having integrated 3D modeling and searching capabilities. The architecture includes servers 130 connected to clients 110 over a network 150. The servers 130 are configured to host and/or provide searchable data of a 3D object, such as the human body, including related content such as web pages and user generated or provided content. In certain aspects, the searchable data of the 3D object includes a polygon mesh that defines the shape of a polyhedral object in 3D space that is representative of the 3D object. The searchable data can include identifiers of portions of the 3D object that can be searched using a query received from a user. For example, the searchable data of the 3D object can represent an organism, such as a human, dog, or ant, or an inanimate object such as a car engine. As another example, the searchable data of the 3D object can represent a 3D object having no internal structure, such as a sculpture, where the user in response to entering the query "head" is automatically shown the head of the sculpture. For purposes of load balancing, the searchable data can be hosted either on one or many separate servers 130.

The servers 130 can be any device having an appropriate processor, memory, and communications capability for hosting the searchable data of the 3D object and related content. The clients 110 to which the servers are connected over the network 150 can be, for example, desktop computers, mobile computers, tablet computers, mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each of the clients 110 is configured to receive part or all of the searchable data of the 3D object and display the searchable data to a user of the client 110 for the user to view in a 3D space, search, edit, and annotate. The user can view, at varying levels of detail, the 3D object from a position at any point outside or inside of the object, and can move the position of the view using an input device such as a keyboard, mouse, or a touchscreen. The user can also to choose adjust the opacity of portions of the 3D object, such as by reducing the opacity of a surface layer to zero in order to see through the surface layer and view an inner layer. The user can further search the 3D object by entering a query. For example, when the user types "lung," the opacity of the skin, muscular, and skeletal layers of a 3D human body is reduced and the position of the view is adjusted so that the user can see a lung. These features will be discussed in more detail herein below.

The searchable data of the 3D object is retrieved by the client 110 from the server 130 using a 3D enhanced application, such as a web browser or mobile application. The 3D enhanced web browser includes an integrated 3D modeling and searching capability that is built-in to the web browser, e.g., a part of the web browser by default, as a standard, at the time the web browser is downloaded and installed on the client 110. An exemplary 3D modeling and searching capability is provided by WebGL, a 3D graphics application programming interface. Exemplary 3D enhanced web browsers include web browsers pre-installed with WebGL.

Exemplary Client and Server

Figure 2:
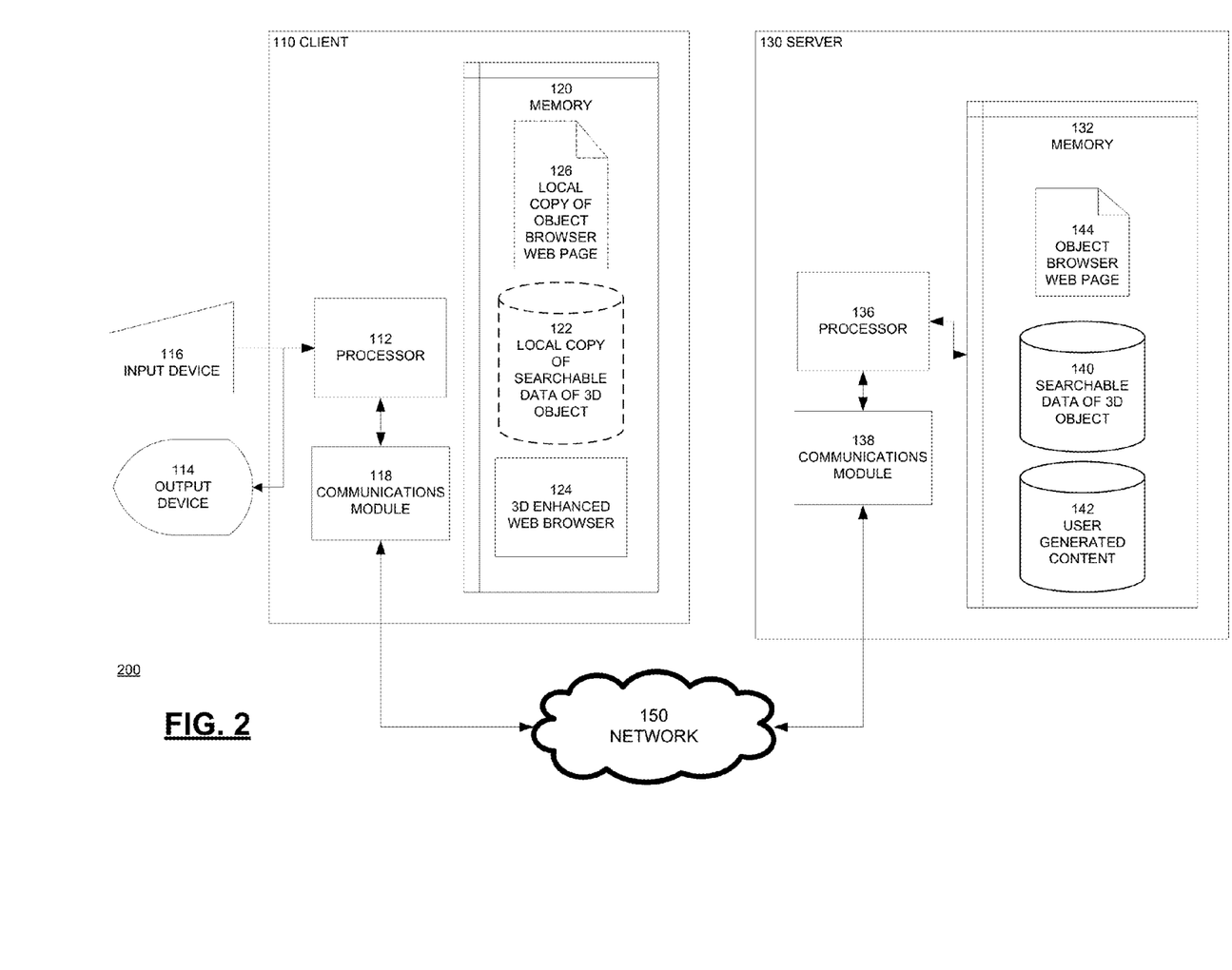
FIG. 2 is a block diagram illustrating an exemplary client and server in the architecture of FIG. 1 according to certain aspects of the disclosure.

FIG. 2 is a block diagram 200 illustrating an exemplary client 110 and server 130 in the architecture 100 of FIG. 1 according to certain aspects of the disclosure. The client 110 and the server 130 are connected over the network 150 via respective communications modules 118 and 138. The communications modules 118 and 138 are configured to interface with the network 150 to send and receive information, such as data, requests, responses, and commands to other devices on the network. The communications modules 118 and 138 can be, for example, modems or Ethernet cards.

The server 130 includes a processor 136, the communications module 138, and a memory 132. The memory 132 includes searchable data of the 3D object 140, a web page 144 for instructing a 3D enhanced web browser on how to model and search the 3D object (hereinafter "object browser web page 144") using the searchable data of the 3D object 140, and user generated content 142 related to the searchable data of the 3D object 140. The client 110 includes a processor 112, the communications module 118, an input device 116, an output device 114, and a memory 120. The memory 120 of the client 110 includes the 3D enhanced web browser 124 and optionally includes a local copy of the object browser web page 126 and a local copy of the searchable data of the 3D object 122. Thus, the object browser web page 144 and the searchable data of the 3D object 140 can be locally stored or remotely stored. A determination of whether to store a local copy of the object browser web page 126 and a local copy of the searchable data of the 3D object 122 can be made by the 3D enhanced web browser 124. For example, the 3D enhanced web browser 124 can include a setting of whether to store files in a local cache, or the object browser web page 144 itself can determine, for example, to stream only necessary information from the searchable data of the 3D object 140 to the client 110 and not store it in the memory 120 of the client.

The local copy of the object browser web page 126 and the local copy of the searchable data of the 3D object 122 are loaded into the memory 120 of the client 110 after a user of the client 110 (hereinafter simply "the user") selects the web address for the object browser web page 144 in the 3D enhanced web browser 124, and the 3D enhanced web browser 124 sends a request to the server 130 for the object browser web page 144 and related searchable data of the 3D object 140. The processor 136 of the server is configured to receive the request from the 3D enhanced web browser 124, and provide to the 3D enhanced web browser 124 of the client 110, in response to the request, the searchable data of the 3D object 140 and the object browser web page 144. The client 110 can then store the local copy of the object browser web page 126 and the local copy of the searchable data of the 3D object 122 in its memory 120. In the alternative, the web browser 124 of the client 110 downloads the searchable data of the 3D object 140 on demand (e.g., streaming), and/or an initial portion of the searchable data of the 3D object 140 is stored locally (e.g., as the local copy of the searchable data of the 3D object 122) to begin the display of the 3D object on the output device 114 and the remaining portion of the searchable data of the 3D object 140 is downloaded as requested or needed by the 3D enhanced web browser 140 for display on the output device 114.

The processor 112 of the client 110 is configured to execute instructions, such as instructions physically coded into the processor 112, instructions received from software in memory 120, or a combination of both. For example, the processor 112 of the client 110 is configured to execute instructions from the local copy of the object browser web page 126 causing the processor 112 to display, in the 3D enhanced web browser 124 on the output device 114, at least a portion of the 3D object based on an initial default view, or a user selected view based on a query received from the user using the input device 116. As discussed herein in more detail, a view of the 3D object can include features to provide an opacity of the different portions of the 3D object, rotation of the 3D object, zoom, whether any portion of the 3D object has been selected, the state of any interfaces displayed, parameters related to customization of the 3D object generated by a user, and any annotations on the 3D object. The output device 114 can be a computer display, such as a touch screen display. The query can be an alphanumeric input, such as "liver" or "2" (for cervical spinal nerve 2), or input from an input device 116. Similarly, the query can be an alphanumeric input indirectly related to a portion of the 3D object (e.g., for a human body, the entry "cirrhosis" can map to the liver) based on, for example, pre-defined mappings, user-generated contents, or implicit connections, such as prior user history. Exemplary input devices 116 include a keyboard, mouse, or touch screen display. Using the input device 116, the user can view any portion of the 3D object in the 3D enhanced web browser 124 from any angle at any position inside or outside the 3D object. The user can also use the input device 116 to search the 3D object and create, edit, and delete user generated content 142 related to the 3D object that is displayed on the output device 114.

Although the block diagram 200 illustrates, in the same memory 132 of a single server 130, the searchable data of the 3D object 140, the user generated content 142, and the object browser web page 144, the searchable data of the 3D object 140, the user generated content 142, and the object browser web page 144 can be in different memories and/or on different servers 130 as discussed above with reference to FIG. 1.

Obtaining Searchable Data for a 3D Object on the Client

Figure 3:
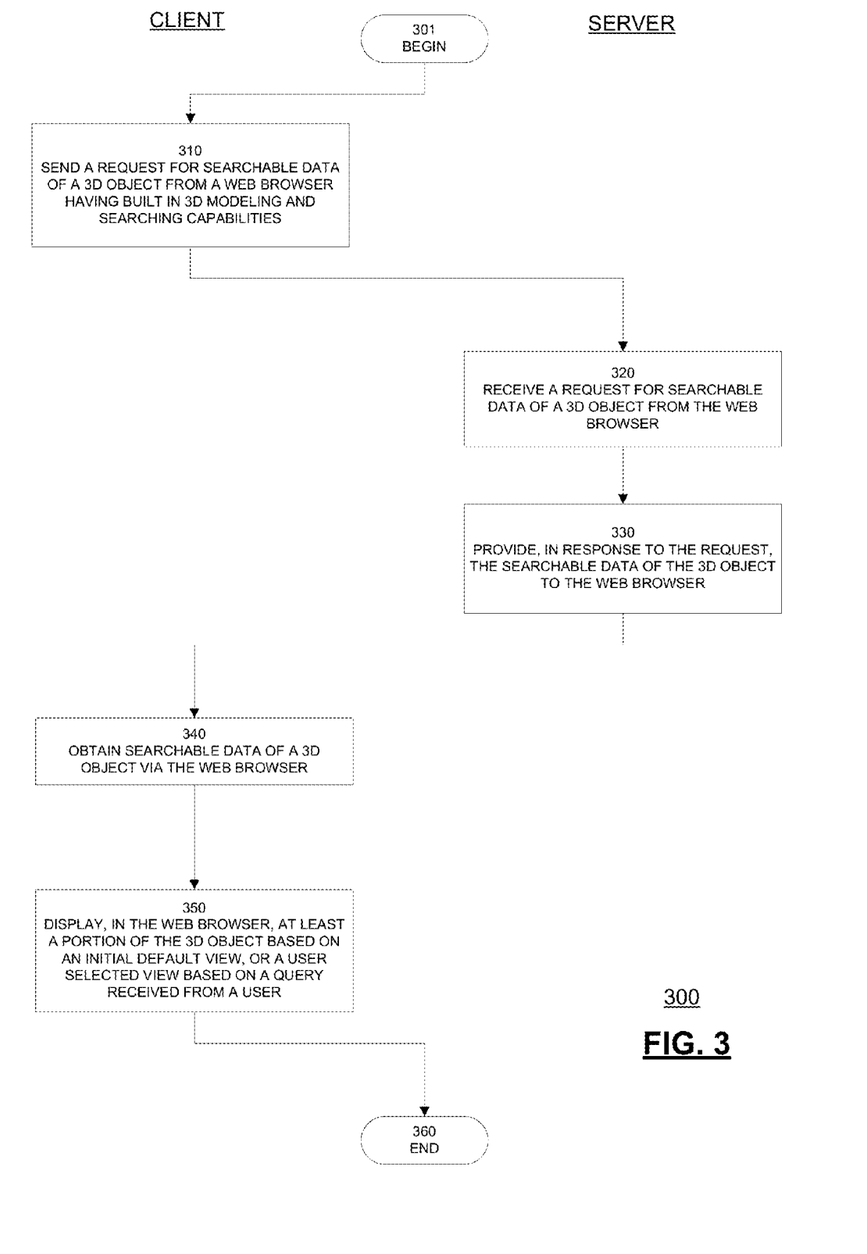
FIG. 3 illustrates an exemplary process for obtaining searchable data of the 3D object from the server of FIG. 2 using the 3D enhanced web browser of the exemplary client of FIG. 2.

FIG. 3 illustrates an exemplary process 300 for obtaining searchable data of the 3D object from the server 130 of FIG. 2 using the 3D enhanced web browser 124 of the exemplary client 110 of FIG. 2.

The process 300 begins by proceeding from step 301 to step 310 when the user of a desktop client 110 loads the 3D enhanced web browser 124 and enters an address, such as a Uniform Resource Locator (URL), for the object browser web page. In step 310, the 3D enhanced web browser 124 sends a request to the server 140 for the object browser web page 144 and its related searchable data of the 3D object 140. In step 320, the server 130 receives the request. A copy of the searchable data of the 3D object 140 is available on the server 130 to provide in response to the request.

The copy of the related searchable data of the 3D object 140 and a copy of object browser web page 144 is provided in step 330 by the server 130, in response to the request from the desktop client 110, to the 3D enhanced web browser 124 on the desktop client 110. In step 340, the desktop client 110 obtains the copy of the object browser web page 144 and a copy of the searchable data of the 3D object 140 via the 3D enhanced web browser 124. A local copy of the object browser web page 126 and a local copy of the searchable data of the 3D object 122 are stored in the memory 120 of the desktop client 110. In step 350, the desktop client 110 uses a monitor 114 to display the exemplary screenshot of an initial default view of the 3D object loaded in the 3D enhanced web browser 124 as shown in FIG. 4A, and the process 300 ends in step 360.

Viewing the 3D Image in a 3D Enhanced Web Browser

Figure 4A:
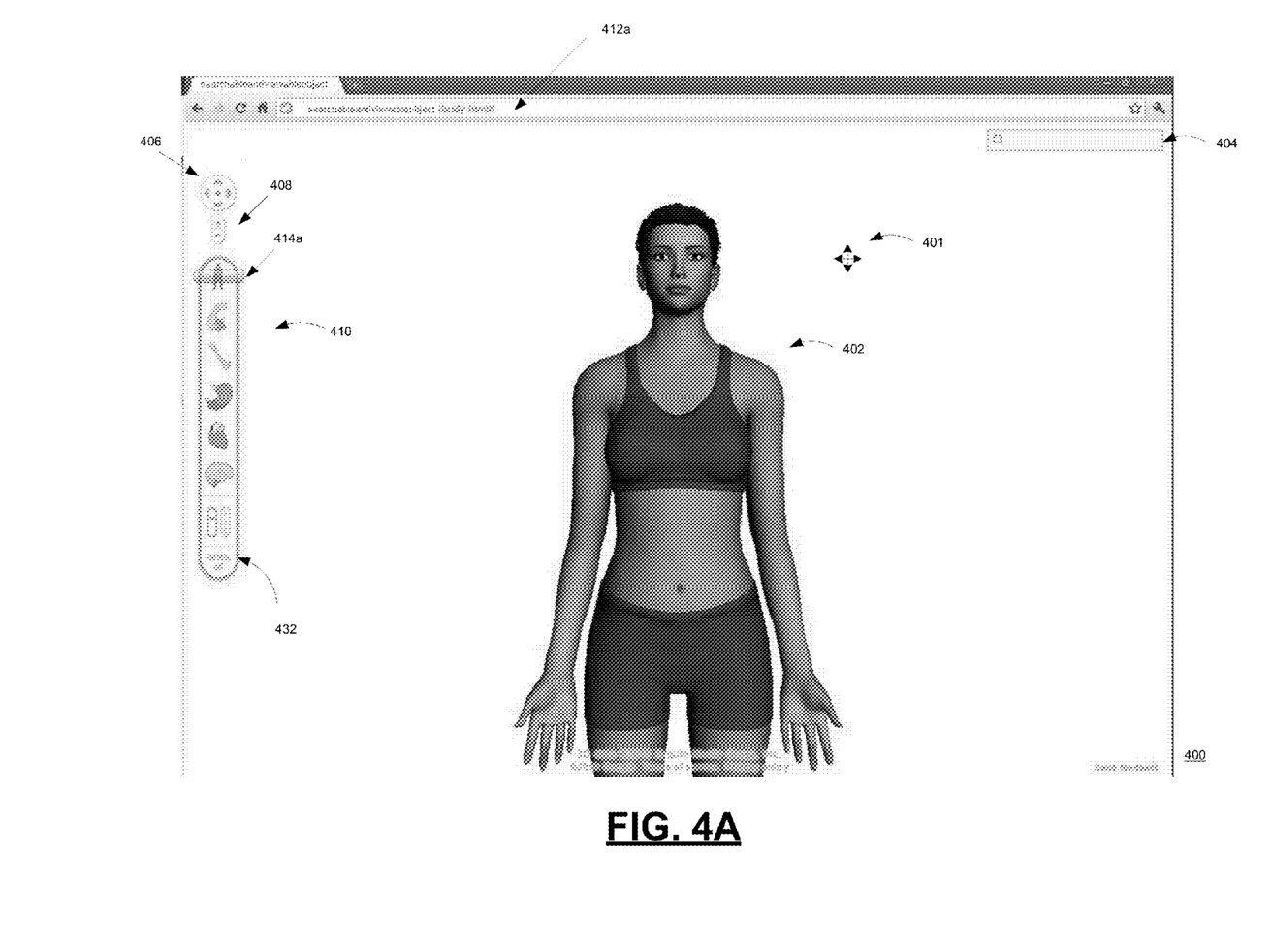
FIGS. 4A-4C are exemplary screenshots of viewing a 3D object using a web browser having integrated 3D modeling and searching capabilities on the exemplary client of FIG. 2.

Having obtained searchable data of the 3D object at the client 110 from the server 130 using the 3D enhanced web browser 124, FIG. 4A illustrates a screenshot 400 of an initial default view of the 3D object as displayed on the output device 114. In exemplary FIGS. 4A-4C, the 3D object 402 is a human body. The initial default view shows an outer surface of a portion of a 3D object 402, a female object 402, and more specifically, the outside of a clothed female human body, including skin. Although a female human body is used in the screenshots, a male human body can also be used.

The user interface of FIG. 4A includes the 3D object 402, an input field 404 for entering a query to be searched, a position control 406 for moving the position of the current view, a zoom control 408 for adjusting the zoom of the current view, and an opacity adjustment interface 410 (hereinafter referred to as "slider 410") having a movable indicator 414a for adjusting the opacity of the outer surface and/or internal structures (collectively referred to as "layers") of the 3D object 402. The slider 410 includes a labeling option 432 to display all relevant labels in the current view. As discussed herein, the outer surface for a human body includes, but is not limited to, the skin and portions of the body near to or in contact with the external surface of the skin, such as eyes, hair, teeth, ears, nails, and lips. The internal structures include, but are not limited to, inner anatomical layers, biological systems, and organs, down to the tissues, cells, and molecular structures such as DNA or proteins.

Any part of the 3D object 402, whether as a whole or in part, let alone any part of the outer surface or the internal structures, are often referred to herein as "portions" or "items" of the 3D object 402 and can be displayed by the 3D enhanced web browser 124 using the searchable data of the 3D object 140. Furthermore, in addition to the displayed user interface controls 406, 408, and 410, the user can use the input device 116, illustrated by cursor 401, to change the position of the view and the level of zoom of the view of the 3D object 402 to view any portion of the 3D object 402 from any angle (e.g., not limited to any axis). For example, the user can view the heart from the outside of the heart or the inside of the heart. As another example, the user can press and hold a button on a mouse input device 116 while dragging the cursor 401 across the screen in any direction in order to rotate the 3D object 402 in that direction.

Any internal structure or portion of the 3D object 402 can be rendered by the 3D enhanced web browser 124 and viewed from any position using the searchable data of the 3D object 140, including, with reference to a human body, inner anatomical layers, biological systems, organs, tissues, cells, and molecular structures.

Label Untangling

Figure 4B:
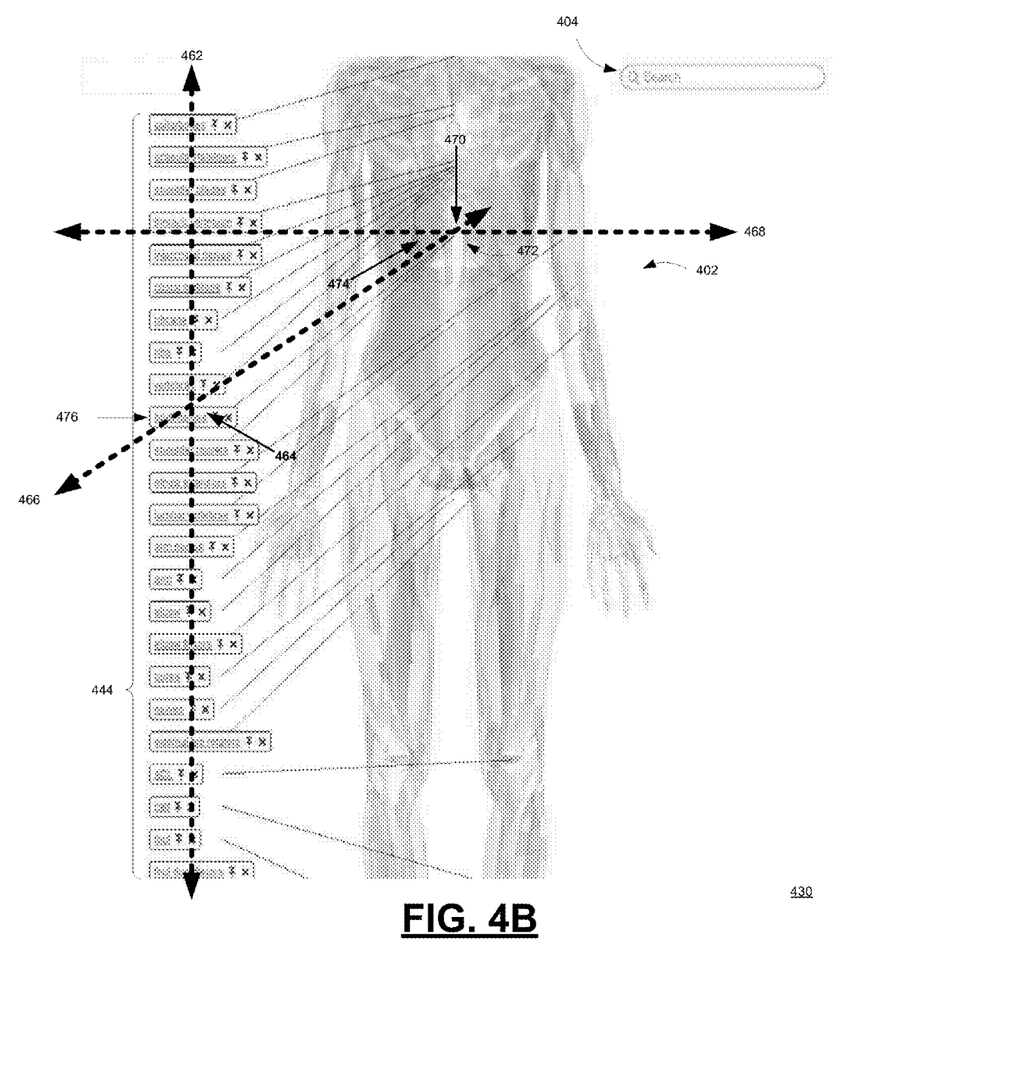

FIG. 4B is another exemplary screenshot 430 of the 3D enhanced web browser 124 that includes labels 444 displayed for portions of the 3D object 402. When many labels 444 are displayed, the processor 112 of the client 112 can be configured to display the many labels 444 according to the following procedure. First, a first axis is defined within the display of the 3D enhanced web browser 124. Next, a position is selected, from a plurality of positions along the first axis, that has a smallest angle between the selected position and the portions of the 3D object 402 that still need to have a label displayed. The smallest angle can be defined as the angle at the intersection, at the portion of the 3D object 402, of a second axis within the current view between the selected position and the portion of the 3D object 402 with a third axis that is substantially perpendicular to the first axis. Afterwards, the label associated with the portion of the 3D object 402 is displayed at a point along the second axis.

Figure 4C:
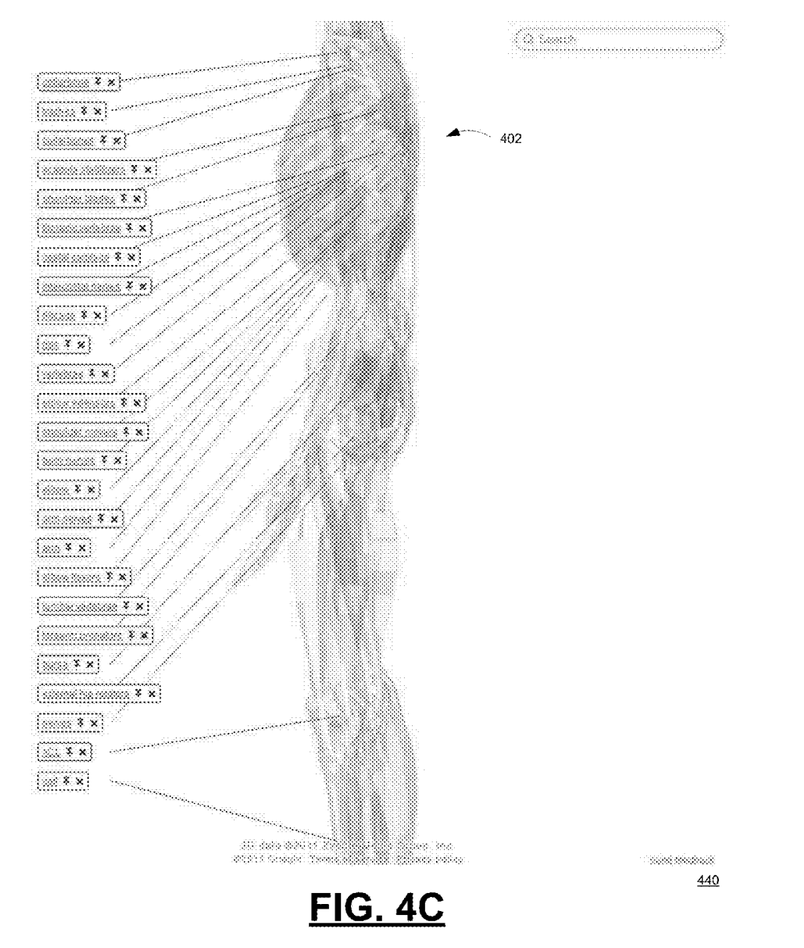

For example, in FIG. 4B, displaying a 3D human body as the 3D object 402, a first axis 462 is defined within the display of the 3D enhanced web browser 124. Next, a position 464 is selected, from a plurality of positions along the first axis 462, that is associated with a smallest angle between the selected position 464 and the portions of the body (e.g., body nerves 472) that still needed to have a label displayed. The smallest angle is the angle 474 at the intersection 470, at the body nerves 472, of a second axis 466 between the selected position 464 and the body nerves 472 with a third axis 468 that is substantially perpendicular to the first axis 462. Afterwards, the label 476 associated with the body nerves 472 is displayed at a point 472 along the second axis 466. FIG. 4C is a further exemplary screenshot 440 of the 3D enhanced web browser 124 that includes labels 444 displayed for portions of the 3D object 402 using the above-described procedure.

In certain aspects, if there are multiple labels to display, then a label that is blocking another label is either moved until it no longer blocks the label, or it is removed completely. Other aspects taken into account when determining when and where to display a label include the size of the label, the transparency of portions within the display, the size of the portions, what side of the label the portion is on, and the inertia of the query (e.g., the pointing device) in getting or moving away from the current view.

Annotations

The user can further generate annotations for any portion of the 3D object 402 for display in the 3D enhanced web browser 124. In certain aspects, annotations are a special type of label that otherwise follow the rules for displaying labels disclosed above and are searchable using the input field 404. Annotations include user-defined labels. The user can assign annotations to one or many portions of the 3D object 402, such as by creating an arbitrary group of body parts for a human body and assigning the arbitrary group an annotation. These annotations can be shared in, and displayed with, the bookmarks described above. For example, the content, location, and display parameters of an annotation can be stored as part of the URL of the bookmark. The annotations can be stored in the user generated content 142 database in the memory 132 of the server 130 for accessibility and viewing by other users.

With reference to a human body, the annotations can include text describing the associated body portion, such as a definition of the associated body portion or an explanation of a medical procedure or condition related to the associated body portion. The annotations can be used to teach students, such as by providing annotations with definitions or annotations that are examination questions.

Exemplary Computer System for the Server and/or Client

Figure 5:
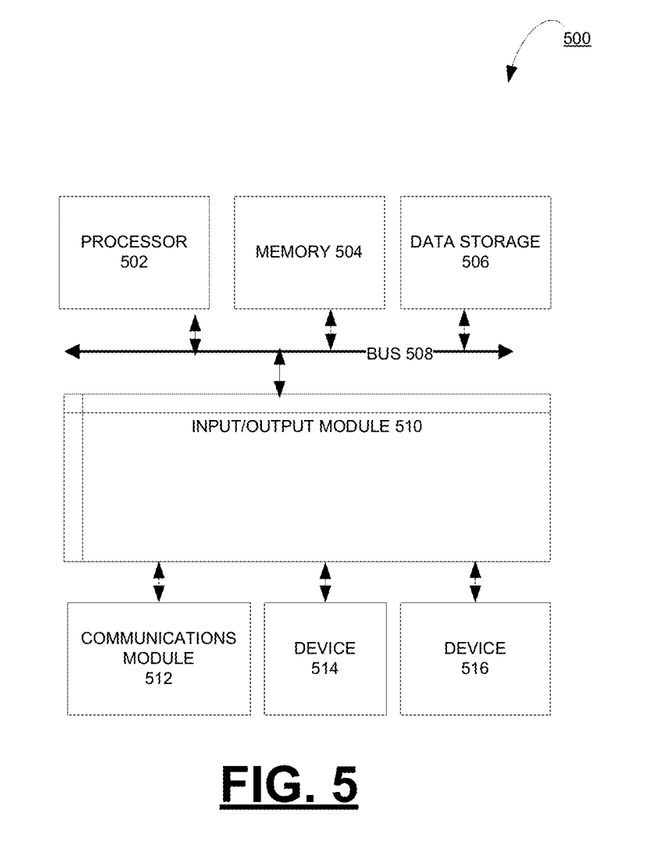
FIG. 5 is a block diagram illustrating an exemplary computer system with which the clients and servers of FIG. 1 can be implemented.

FIG. 5 is a block diagram illustrating an exemplary computer system with which the clients 110 and servers 130 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., clients 110 and servers 130) includes a bus 508 or other communication mechanism for communicating information, and a processor 502 (e.g., processor 112 and 136) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 120 and 132), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512 (e.g., communications module 118 and 138). Exemplary communications modules 512 include networking interface cards, such as Ethernet cards and modems. In certain aspects, the input/output module 510 is configured to connect to a plurality of devices, such as an input device 514 (e.g., input device 116) and/or an output device 516 (e.g., output device 114). Exemplary input devices 514 include a keyboard and a pointing device, e.g., a mouse or a trackball, by which a user can provide input to the computer system 500. Other kinds of input devices 514 can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network.

Computing system 500 can include clients and servers. A client and server are generally remote from each other and typically interact through a communication network. The relationship of client and server arises by virtue of computer programs running on the respective computers and having a client-server relationship to each other. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for using a 3D-enhanced web browser to view a labeled 3D object, such as the human body, have been described. In certain aspects, using the 3D enhanced web browser, a user can view the 3D object and associated labels in a way that the labels do not obstruct one another or the view of the 3D object.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A method for viewing a labeled three-dimensional (3D) object comprising:
   obtaining viewable data of a 3D object;
   displaying at least a portion of an outer surface of the 3D object based on a current view comprising an initial default view, or a user selected view based on a query received from a user;
   retrieving, from storage, at least one identification label for each of a plurality of items within the current view;
   defining a first axis within the current view;
   selecting, from a plurality of positions along the first axis, a position that has a smallest angle between the selected position and a selected item from the plurality of items;
   displaying the identification label associated with the selected item at a point along a second axis within the current view between the selected position and the selected item;

rotating within the 3D object around a display of at least one internal structure beneath the outer surface of the 3D object in response to the query or a selected computer-generated search term to another view;

adjusting an opacity of a portion of the outer surface of the 3D object and updating the display of the identification labels based on the rotated display within the 3D object and the adjusted opacity, wherein the smallest angle is defined as the angle at the intersection, at the selected item, of the second axis with a third axis that is substantially perpendicular to the first axis.

2. The method of claim 1, wherein the 3D object is obtained and viewed in a web browser having integrated 3D modeling capabilities.

3. The method of claim 1, wherein the at least one identification label is user defined.

4. The method of claim 1, wherein the identification label associated with each of the plurality of items is displayed at an offset from the second axis.

5. The method of claim 1, wherein the current view comprises at least one of a rotation of the at least a portion of the 3D object, an opacity of the outer surface and the internal structure of the 3D object, a level of zoom of the at least a portion of the 3D object, and a determination of whether at least one of the outer surface and the internal structure are selected.

6. The method of claim 1, further comprising:
providing at least one computer-generated search term, from a predetermined list of stored search terms, in response to alphanumeric input from the user, the at least one computer-generated search term being responsive to the alphanumeric input; and
upon selecting the at least one computer-generated search term, concurrently displaying an item and an identification label associated with the computer-generated search term,
wherein the identification label associated with the computer-generated search term is displayed along the second axis.

7. The method of claim 1, wherein, when the current view is at a first point above the outer surface and the user selects to view the at least one internal structure from a second point beneath the outer surface, the current view transcends from the first point through the outer surface to the second point within the current view and the display of the identification labels is updated based on the transcended current view.

8. A system for viewing a labeled three-dimensional (3D) object comprising:
a memory for storing viewable data of a 3D object, and a plurality of identification labels associated with the 3D object; and
a processor configured to:
display at least a portion of an outer surface of the 3D object based on a current view comprising an initial default view, or a user selected view based on a query received from a user;
retrieve at least one identification label, from the plurality of identification labels, for each of a plurality of items within the current view;
define a first axis within the current view;
select, from a plurality of positions along the first axis, a position that has a smallest angle between the selected position and a selected item from the plurality of items;
display the identification label associated with the selected item at a point along a second axis within the current view between the selected position and the selected item
rotate within the 3D object around a display of at least one internal structure beneath the outer surface of the 3D object in response to the query or a selected computer-generated search term to another view;
adjust an opacity of a portion of the 3D object;
update the display of the identification labels based on the rotated display within the 3D object and the adjusted opacity,
wherein the smallest angle is defined as the angle at the intersection, at the selected item, of the second axis with a third axis that is substantially perpendicular to the first axis.

9. The system of claim 8, wherein the 3D object is obtained and viewed in a web browser having integrated 3D modeling capabilities.

10. The system of claim 8, wherein at least one of the plurality of identification labels is user defined.

11. The system of claim 8, wherein the identification label associated with each of the plurality of items is displayed at an offset from the second axis.

12. The system of claim 8, wherein the current view comprises at least one of a rotation of the at least a portion of the 3D object, an opacity of the outer surface and the internal structure, a level of zoom of the at least a portion of the 3D object, and a determination of whether at least one of the outer surface and the internal structure are selected.

13. The system of claim 8, wherein the processor is further configured to:
provide at least one computer-generated search term, from a predetermined list of stored search terms, in response to alphanumeric input from the user, the at least one computer-generated search term being responsive to the alphanumeric input; and
upon selecting the at least one computer-generated search term, concurrently display an item and an identification label associated with the computer-generated search term,
wherein the identification label associated with the computer-generated search term is displayed along the second axis.

14. The system of claim 8, wherein, when the current view is at a first point above the outer surface and the user selects to view the at least one internal structure from a second point beneath the outer surface, the current view transcends from the first point through the outer surface to the second point within the current view and the display of the identification labels is updated based on the transcended current view.

15. A non-transitory machine-readable storage medium comprising machine-readable instructions for causing a processor to execute a method for viewing a labeled three-dimensional (3D) object comprising:
obtaining viewable data of a 3D object;
displaying at least a portion of an outer surface of the 3D object based on a current view comprising an initial default view, or a user selected view based on a query received from a user;
retrieving, from storage, at least one identification label for each of a plurality of items within the current view;
defining a first axis within the current view;
selecting, from a plurality of positions along the first axis, a position that has a smallest angle between the selected position and a selected item from the plurality of items;

displaying the identification label associated with the selected item at a point along a second axis within the current view between the selected position and the selected item;

rotating within the 3D object around a display of at least one internal structure beneath the outer surface of the 3D object in response to the query or a selected computer-generated search term to another view;

adjusting an opacity of a portion of the 3D object; and updating the display of the identification labels based on the rotated display within the 3D object and the adjusted opacity, wherein the smallest angle is defined as the angle at the intersection, at the selected item, of the second axis with a third axis that is substantially perpendicular to the first axis.

* * * * *